United States Patent [19]
Luy et al.

[11] Patent Number: 5,809,705
[45] Date of Patent: Sep. 22, 1998

[54] WALL WHICH HAS AT LEAST ONE WINDOW WITH AT LEAST ONE GLASS PANE

[75] Inventors: Bernhard Luy, Freiburg; Matthias Tondar, Hausen, both of Germany

[73] Assignee: Glatt GmbH, Binzen, Germany

[21] Appl. No.: 773,327

[22] Filed: Dec. 23, 1996

[30] Foreign Application Priority Data

Dec. 29, 1995 [CH] Switzerland .............................. 3708/95

[51] Int. Cl.⁶ ....................................................... E06B 7/00
[52] U.S. Cl. .......................................... 52/171.1; 126/698
[58] Field of Search ................................ 52/171.1, 788.1, 52/306, 308, 775; 126/698, 708

[56] References Cited

U.S. PATENT DOCUMENTS

| | | | |
|---|---|---|---|
| 2,913,780 | 11/1959 | Weisselberg | 52/171.1 |
| 3,192,575 | 7/1965 | Rosenauu, Jr. et al. | 52/171.1 |
| 3,273,557 | 9/1966 | Borch et al. | 52/171.1 X |
| 3,696,833 | 10/1972 | Low et al. | 52/171.1 X |
| 4,164,108 | 8/1979 | Ortmanns | 52/308 X |
| 4,951,652 | 8/1990 | Ferrario et al. | 52/171.1 X |

*Primary Examiner*—Creighton Smith
*Attorney, Agent, or Firm*—Jacobson, Price, Holman & Stern, PLLC

[57] ABSTRACT

The wall has at least one wall part in which at least one window is fastened. The wall part has a casing and has a hole for each window. The window has at least one glass pane and a holder which encloses said pane and is tightly and nondetachably connected to said pane. A connection part enclosing the holder has a web and two limbs projecting from said web toward the holder. The connection part is welded to the casing at the web and to the holder at those ends of the limbs which face away from the web. The or each glass pane can thus be connected to the wall part tightly without an elastomeric seal and in such a manner that no fissures, crevices or other dead spaces result on the inside of the window.

26 Claims, 3 Drawing Sheets

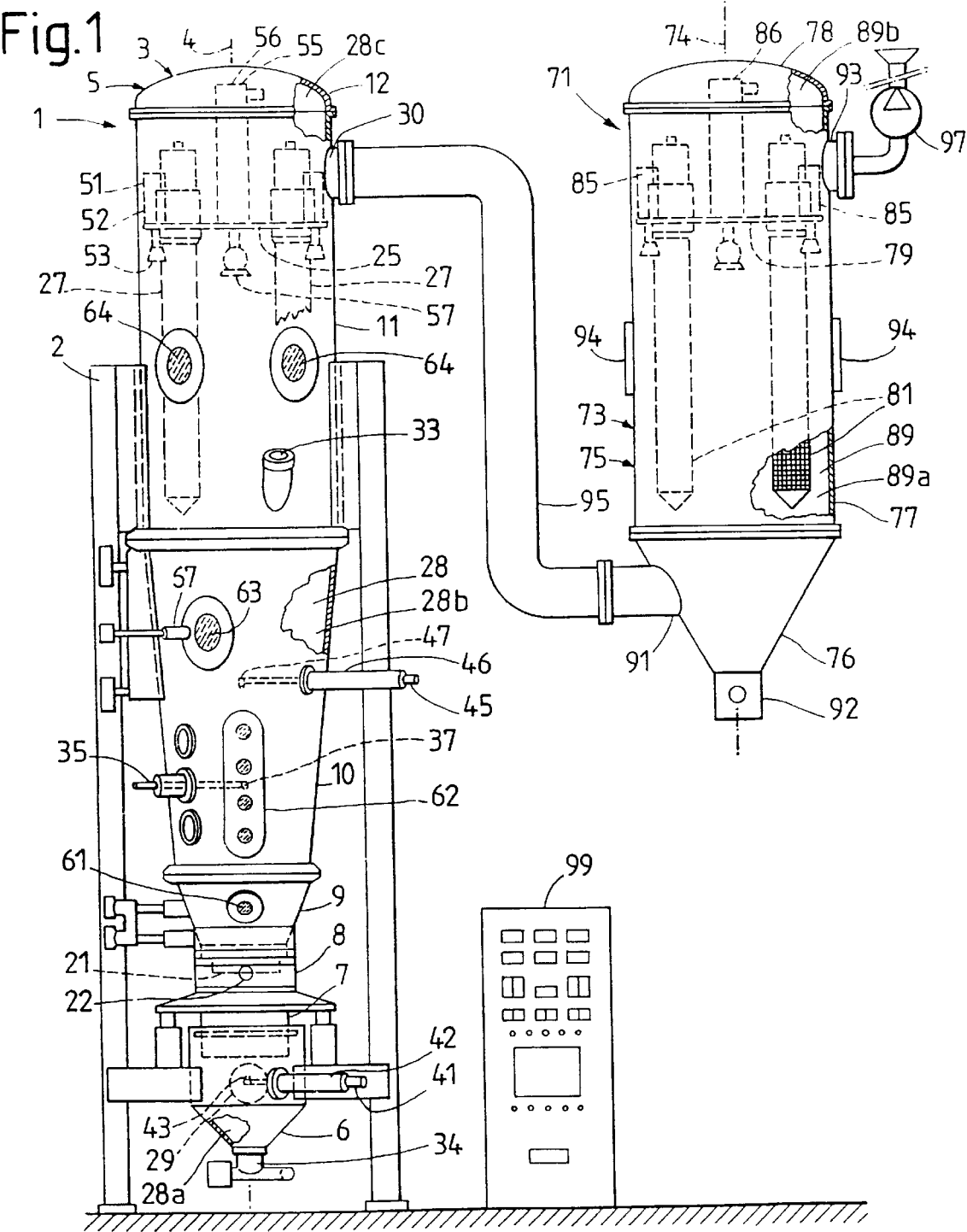

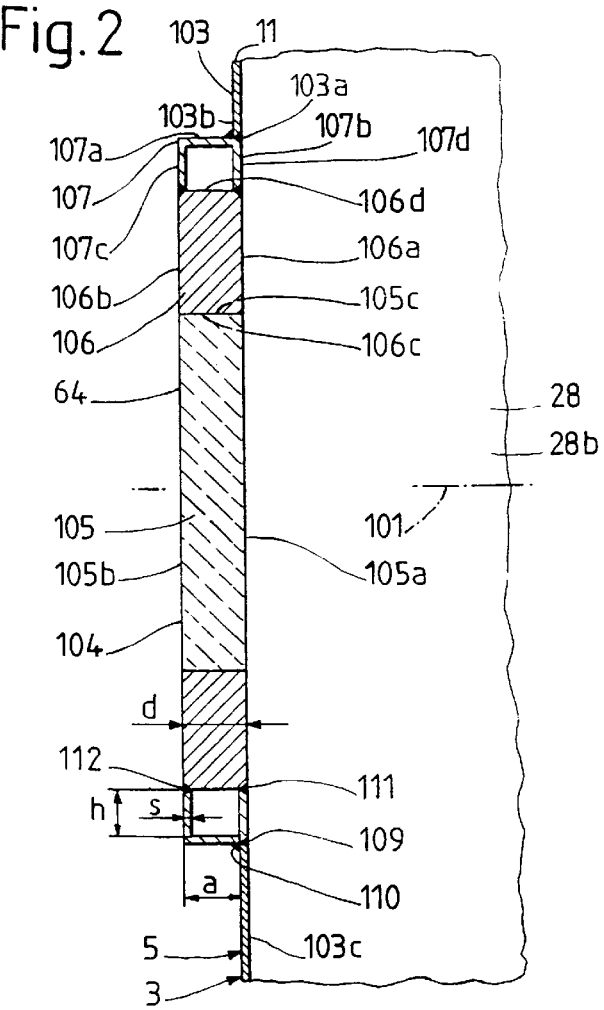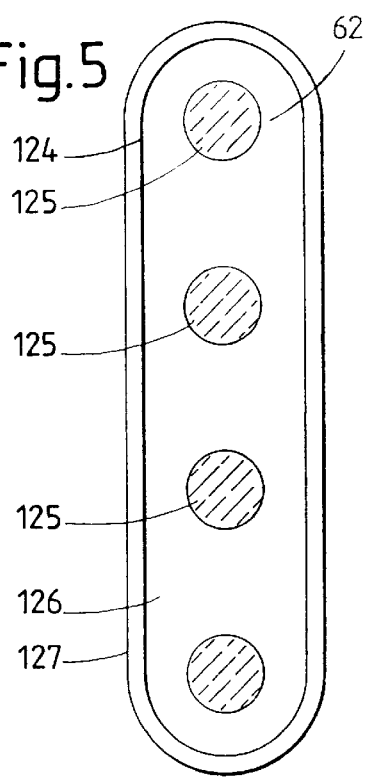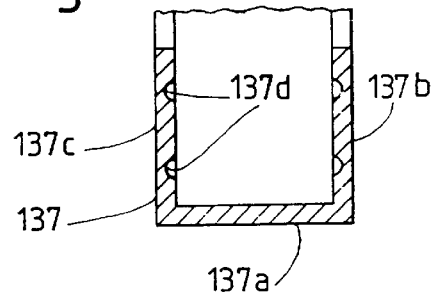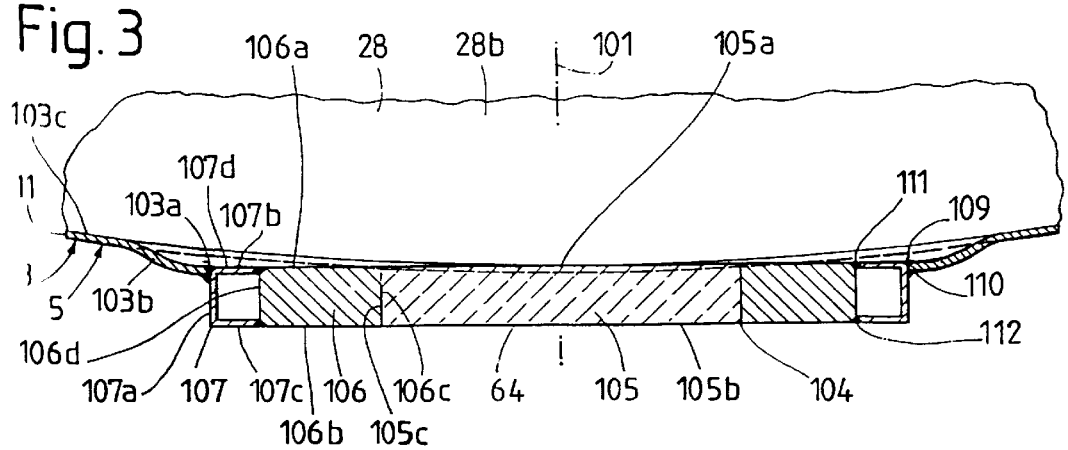

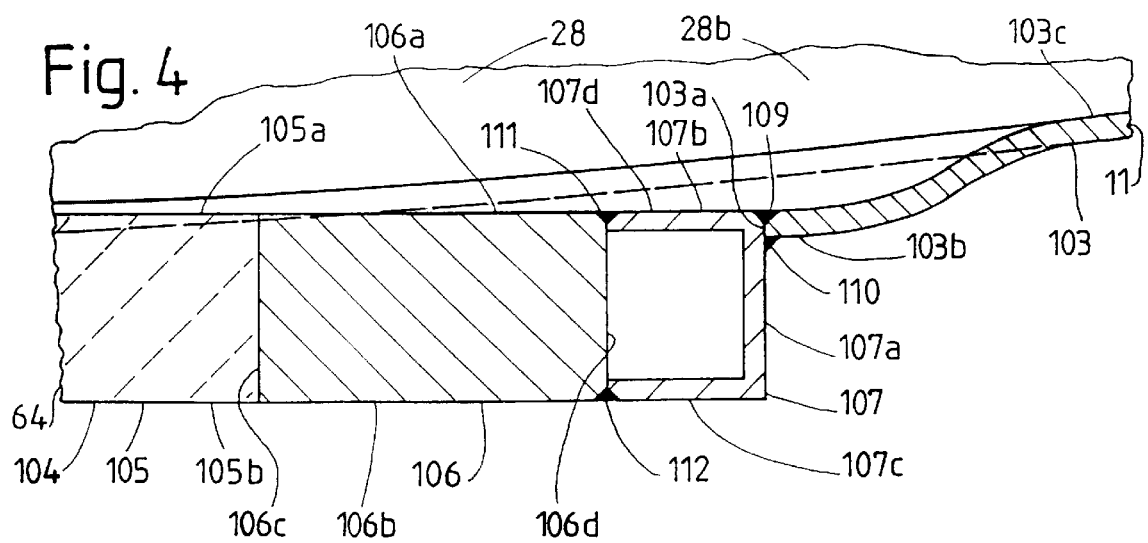
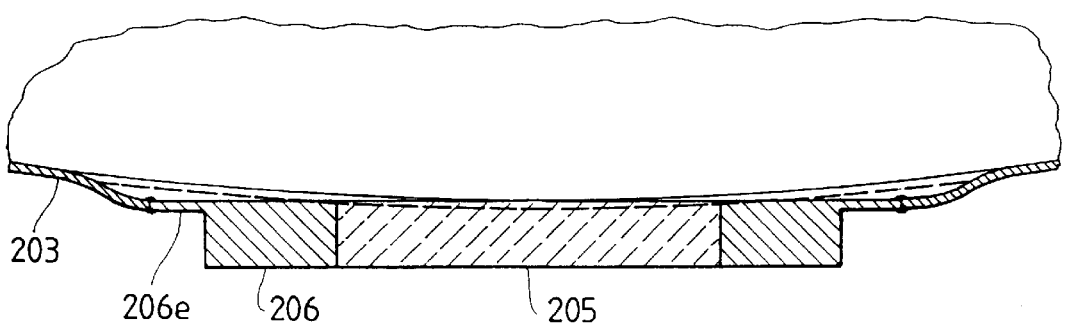

WALL WHICH HAS AT LEAST ONE WINDOW WITH AT LEAST ONE GLASS PANE

BACKGROUND OF THE INVENTION

1. Field of the Invention

The invention relates to a wall which encloses an interior and has at least one wall part with at least one window which has at least one glass pane adjacent to the interior.

The wall may form, for example, a container which serves for receiving a particulate or possibly pasty material to be agitated and to be treated and/or for filtering gas passed through a particulate material. The container may be formed in particular as a material and fluidized-bed container and may bound a fluidizing and process space for receiving, fluidizing and treating a particulate material which serves, for example, for the formation of a drug.

2. Description of the Prior Art

A vacuum container disclosed in GB 805 812 A and having a window possesses a support ring nondetachably fastened to a wall part, a glass pane firmly clamped to said ring by means of a clamping ring and a seal which connects said pane tightly to the support ring. Known material and fluidized-bed containers have at least one cylindrical or conical wall part on which a support ring is arranged for the or each window and is connected to the casing by means of a short connecting piece. The or each window has a glass pane which is removably fastened, for example similarly to that of the window disclosed in GB 805 812 A, on the support ring by means of a clamping ring and by means of screws and with an elastomeric seal—for example a gasket.

Such windows have, on the inside, gaps, channels, fissures, recesses and the like in the connecting piece, in the support ring and especially in the seal. Said gaps, channels, fissures, crevices and the like have in some cases angular edges and form dead spaces for gas flowing through the container. Material particles and/or dust and/or spray material and/or other contaminant materials may be deposited in such dead spaces during fluidizing of a material. A frequent occurrence in known fluidized-bed apparatuses during spraying of a tacky spray material, moreover, is that a layer which to a considerable extent or even completely covers the inner surface of the glass pane is built up in a short time from the deposition of material from a dead space located at the edge of the window and the window no longer fulfils its purpose. Furthermore, there is the danger that cultures of microorganisms will develop in the gaps, channels and/or fissures and/or crevices.

If the particulate materials processed in the container of a fluidized-bed apparatus serve, for example, for the formation of drugs and/or contain toxic substances, it is therefore frequently necessary, in particular on changing the processed materials, to separate the clamping ring, the glass pane and the seal of each window from the remaining wall and from one another by slackening screws for cleaning and, after cleaning, to fasten them to the wall again. This may result in contamination of the environment and of the operator with substances which are hazardous to health or otherwise harmful. Furthermore, insufficient care on the part of personnel carrying out cleaning may impair the purity and quality of the products produced after the cleaning. The dismantling, cleaning, drying and thereafter necessary assembly of the window furthermore entail a great deal of work and require a great deal of time. If a window is reassembled after cleaning, there is the danger that there may be a leak. Furthermore, the or each seal must be replaced from time to time.

Similar problems also arise in the case of windows of other containers which serve, for example, for agitating and/or treating a gas and/or for carrying out chemical and/or biological reactions and/or for filtering and removing dust from gas passed through a material and/or for filtering a liquid. Moreover, similar problems may also arise in the case of windows of lines for conducting a flowable material.

EP 0 365 802 A and U.S. Pat. No. 4,961,628 corresponding to it disclose a composite plate which serves for forming a window and has an annular steel holder and a glass pane fused into the holder. The fastening of the composite plate is not disclosed. However, it is known from practice that such composite plates can be detachably fastened by means of screws and clamping rings and can be sealed with at least one elastomeric seal.

An apparatus disclosed in the abstract of JP 60 222 744 A has a pipe and serves for carrying out measurements on an air stream flowing through the pipe and containing particles. The apparatus has a short connecting piece which projects at right angles away from the lateral surface of the pipe and is provided with a support ring at its end facing away from the pipe. A glass pane which serves for forming a window is fastened to said support ring. The abstract and the drawing, which may not show all parts of the window, do not reveal how the glass pane is fastened to the support ring and whether and how the connection between the glass pane and the support ring is sealed.

The connecting piece, together with the lateral surface of the pipe and the glass pane, bounds a dead space for the air stream so that particles accumulate on the window. If the apparatus according to JP 60 222 744 A also has a seal, which is not shown, this causes problems similar to those encountered with the seals of the apparatuses described above. Furthermore, it is questionable as to whether the window disclosed in JP 60 222 744 A withstands large temperature changes and pressures greater than or less than ambient pressure which occur in the interior of the pipe, without the glass pane being damaged or being forced away from the pipe.

SUMMARY OF THE INVENTION

It is the object of the invention to provide a wall which has at least one window and by means of which the disadvantages of the known walls can be avoided. In particular, it should be permitted that as small an amount of impurities as possible accumulate on the inside of the or each window and that the or each window can be thoroughly cleaned without dismantling.

This object is achieved, according to the invention, by a wall which encloses an interior and has at least one wall part with at least one window which possesses at least one glass pane adjacent to the interior and having a circumferential surface, wherein the or each window has a holder which encloses the or each glass pane belonging to said window, is connected tightly to the circumferential surface of said glass pane and has an inner surface adjacent to the interior and wherein the holder is connected to the wall part by means of an additional connection part or is directly and tightly nondetachably connected to said wall part.

According to the invention, the holder of the or each window is tightly and nondetachably connected to the or a wall part of the wall. The or each glass pane of a window is tightly and preferably also nondetachably connected to the holder of the relevant window. "Nondetachably connected"

means that the glass pane(s), the holder and the wall part provided with the window cannot be separated from one another by slackening screws or fast-action closure parts or other fastening members detachable by movement. The glass pane(s), the holder and the wall part having a window can therefore be separated from one another only with damage to the glass pane and/or to another part of the window and/or to the wall part having the window.

The or each glass pane of a window is connected to the holder, for example by fusing into the holder of the window, as disclosed in EP 0 365 802 A already cited and in U.S. Pat. No. 4,961,628 corresponding to this. The holder then forms, for example together with the or each glass pane enclosed by it, a composite plate. The holder preferably consists of a one-piece, metallic member and is welded, for example, to a connection part or retainer which in turn is welded to the wall part having the relevant window. However, the holder could also be welded directly to a wall part, for example a one-piece sheet metal casing enclosing an axis. The holder can be connected by at least one weld joint via a connection part or retainer or directly, permanently and completely tightly to the or a wall part. Weld joints can also withstand large forces so that pressures greater than or less than the pressure in the environment of the wall can prevail in the interior enclosed by the wall without the window being damaged. Furthermore, weld joints are also resistant to high and low temperatures—relative to normal room temperature—and to organic solvents and other chemical influences.

However, the or at least one weld joint serving for indirectly or directly connecting a holder to a wall part could be replaced by a hard solder joint and/or soft solder joint and/or adhesive bond.

In the case of the wall according to the invention, the or each glass pane and the holder of a window can be connected tightly to a dimensionally stable, for example metallic wall part without an elastomeric seal. This in turn makes it possible to fasten the window to the wall part in such a way that there are no gaps, channels, fissures, crevices or other dead spaces for a fluid flowing through the interior. This prevents or reduces at least undesired material deposits on the window and improves its cleanability. Those inner surfaces of the window which are adjacent to the interior, and those sections of the wall part which are adjacent to said window, can therefore be satisfactorily cleaned, without dismantling the window, by spraying cleaning liquid in the interior. Such cleaning ensures reproducible purity, avoids the danger of contamination arising in the case of the known windows as a result of them being dismantled and requires only a small amount of time and labour.

BRIEF DESCRIPTION OF THE DRAWINGS

The subject of the invention is described in detail below with reference to embodiments shown in the drawings. In the drawings, FIG. 1 shows a view of a fluidized-bed apparatus having a material and fluidized-bed container and a downstream dust remover, FIG. 2 shows a vertical section through a cylindrical wall part and a circular window of the material and fluidized bed container on a larger scale, FIG. 3 shows a horizontal section through the wall part shown in FIG. 2 and through the window arranged in said wall part, FIG. 4 shows a section of FIG. 3 on a larger scale, FIG. 5 shows an end view of the elongated window shown in FIG. 1 and having a plurality of glass panes, on a larger scale than in FIG. 1, FIG. 6 shows a cross-section through a variant of a connection part of a window and FIG. 7 shows a horizontal cross-section analogous to FIG. 3 for a second embodiment of the window.

DESCRIPTION OF THE PREFERRED EMBODIMENTS

The fluidized-bed apparatus 1 shown in FIG. 1 has a stand 2. This has two vertical pillars and holds a material and fluidized-bed container 3 arranged between the pillars. The container 3 defines a vertical container axis 4 and has a wall 5 which is generally rotationally symmetrical with respect to said axis. Said wall has a plurality of wall parts arranged one on top of the other and connected tightly to one another in a detachable and/or adjustable manner and in the position shown, namely, from bottom to top, a bottom wall part 6, a vertically displaceable wall part 7, a generally cylindrical connecting wall part 8, a conical material chamber wall part 9, a conical expansion chamber wall part 10, a cylindrical filter chamber wall part 11 and a top wall part 12.

A gas-permeable perforated bottom 21 is arranged in the container 3. The perforated bottom 21 is mounted on the connecting wall part 8 by means of bearing and pivot members 22 so that it is pivotable about a horizontal axis of rotation and can be fixed in various pivotal positions. The perforated bottom 21 can be held in particular in a normal horizontal operating position and in an approximately vertical emptying position. The container 3 also has an inner wall part 25 which forms a partition. The inner wall part 25 is arranged in the upper half of the filter chamber wall part 11, enclosed by said wall part and connected to it. The inner wall part 25 holds at least one filter 27 detachably fastened to it, preferably at least two filters 27 a distance apart being present.

When the wall parts 6 to 12 are tightly connected to one another, they together enclose a container interior 28 which is sealed tightly from the environment. The perforated bottom 21 in the normal, horizontal operating position and the inner wall part 25 and the filters 27 fastened to said wall part divide the interior 28 into a gas distribution space 28a located below the perforated bottom, a fluidizing and process space 28b located between the perforated bottom and the inner wall parts 25 and a clean gas space 28c located above the liner wall part 25.

The bottom wall part 6 is provided with a gas inlet 29. A gas outlet 30 is arranged in the filter chamber wall part 11, above the inner wall part 25. The container 3 furthermore has a material inlet 33 which opens into the process space 28b and a material outlet 34 arranged at the lower end of the bottom wall part 6. The material inlet and the material outlet have alternatively closable and openable passages. Also present is a spray device 35 which has at least one spray member 37 arranged in the process space 28b and having at least one nozzle for spraying an at least partly liquid material onto the particles of the particulate material which are fluidized in the container 3.

At least one wet cleaning device or wash device 41 has a holder which is fastened to the bottom wall part 6, below the perforated bottom 21, and has a housing 42 and at least one spray member 43 with at least one spray nozzle or outlet orifice. At least one wet cleaning device or wash device 45 has a holder fastened to the expansion chamber wall part 10, above the perforated bottom 21 and above the spray device 35, and having a housing 46 and at least one spray member 47 with at least one spray nozzle or outlet orifice. The housings 42, 46 are arranged essentially outside the wall 5 and contain a housing interior sealed tightly from the environment. The spray members 43 and 47 are horizontally displaceable in the housings 42 and 46, respectively, and can be brought alternatively into a rest position or into a cleaning position shown in FIG. 1. In the rest position, they are essentially outside the container interior 28 of the container, in the housings 42 and 46. The interiors of the latter are then sealed, from the container interior 28, for example by the spray members 43 and 47 and/or by additional closure members, approximately flush with the inner surface of the wall 5. In the cleaning position, each spray member 43 and 47 is present at least partly in the gas distribution space 28a or in the fluidizing and process space 28b, respectively. The spray nozzles of the spray members 43 and 47 are then, for example, approximately at the container axis 4. The spray members 43, 47 can spray a cleaning liquid fed to them, for example into a space which extends over a fairly large solid angle. The or a spray nozzle or outlet orifice of the lower spray member 43 is directed upward. The or at least one spray nozzle or outlet orifice of the upper spray member 47 is directed downward.

The inner wall part 25 furthermore holds at least one wet cleaning device or wash device, for example a plurality of wet cleaning devices or wash devices 51 distributed around the container axis 4 and a larger, wet cleaning device or wash device 55 coaxial with the container axis being present. Each wet cleaning device 51, 55 has a housing 52 or 56, present essentially above the inner wall part 25 in the container 3, and a spray member 53 or 57. Each housing 52, 56 bounds the housing interior tightly sealed from the clean gas space 28c. Each spray member 53, 57 is adjustable and displaceable in the coordinated housing 52 or 56, respectively, and can be brought alternatively into a rest position and into a cleaning position shown in FIG. 1. In the rest position, the spray members 53, 57 are essentially inside the coordinated housing and are then approximately or exactly flush with the lower surface of the inner wall part 25. In the cleaning position, each spray member 43 and 57 is at least partly present in the fluidizing and process space 28b. The spray nozzles of the spray members 53, 57 are then, for example, approximately at the height of the upper end sections of the filters 27.

The housings 42, 46, 52, 56 of the various wet cleaning devices 41, 45, 51, 55 have an inlet for a cleaning liquid. Each wet cleaning device is, for example, furthermore provided with a spring and is formed in such a way that, when a cleaning liquid under pressure is fed in, the spray member, starting from its rest position, is displaced to the cleaning position against the restoring force generated by the spring. The spray member then remains in the cleaning position until the feed of cleaning liquid has ended and the spray member is pushed back into the rest position by the spring.

The container 3 is provided with at least one window arranged in the wall 5 and namely with a plurality of windows adjacent to the fluidizing and process space 28b. The container 3 has, for example, a window 61 arranged in the wall part 9, two windows 62 and 63 arranged in the wall part 10 and two windows 64 arranged in the wall part 11. In plan views, the windows 61, 63 and 64 have a circular contour at their end faces. In a plan view of its end face, the window 62 has an elongated contour. Each window has at least one glass pane. The glass panes of the windows 61, 62, 64, 65 serve as an inspection window through which a person can look into the fluidizing and process space 28b.

An illumination device 67 arranged near the window 63 and outside it and the container 3 has at least one electric light source for shining light through the glass pane of the window 63 into the container interior 28. The illumination device 64 may be formed and arranged in such a way that a person can look past the illumination device through the glass pane of the window 63 into the container. Moreover, additional windows and/or illumination devices which are not visible may be present on the container 3.

The apparatus 1 has a downstream dust remover 71 with a downstream dust remover container 73. Its wall 75 is in general rotationally symmetrical with a vertical container axis 74 and has a plurality of wall parts detachably connected to one another, namely an essentially conical bottom wall part 76 tapering downward, an essentially cylindrical wall part 77 and an arched top wall part 78. An inner wall part 79 which forms a partition is fastened in the downstream dust remover container 73. The inner wall part 79 holds at least one filter 81 and preferably a plurality of filters 81. Furthermore, the container 73 contains at least one wet cleaning device or wash device, for example a few wet cleaning devices or wash devices 85 distributed around the container axis 74 and a larger wet cleaning device or wash device 86 coaxial with the container axis 4 being detachably fastened to the inner wall part 79. The filters 81 and the wet cleaning devices 85, 86, for example, are formed identically or similarly to the filters 19 and wet cleaning devices 51 and 55.

The wall parts 76, 77, 78 together tightly seal an interior 89 from the environment. The inner wall part 79 serving as a partition of the container and the filter 81 fastened to said wall part divide the interior 89 into a crude gas space 89a and a clean gas space 89b, the crude gas space 89a being below, and the clean gas space 89b above, the inner wall part 79. The container 73 has a gas inlet 91 opening into the crude gas space 89a, an alternatively closable and openable outlet 92 arranged at the lower end of the bottom part 76 and a gas outlet 93 leading out of the clean gas space 89b. The wall part 77 has at least one window 94 and, for example, at least two such windows.

The fluidized-bed apparatus 1 also has gas conduction members for passing a process gas, namely air, from bottom to top through the two containers 3, 73. The conduction members have a gas line which is not shown and is connected to the gas inlet 29 of the material and fluidized-bed container 3, a gas line 95 connecting the gas outlet 30 of the material and fluidized-bed container 3 to the gas inlet 91 of the downstream dust remover container 73 and a suction device 97 connected to the gas outlet 93 of the downstream dust remover. Furthermore, an indication and control device 99 having electronic and pneumatic components, small lamps, light emitting diodes, indicating instruments, possibly a monitor and manually operable switches and other operating members is present for monitoring the fluidized bed apparatus 1 and for controlling said apparatus by means of a person and/or automatically.

The formation of one of the windows 64 is described in more detail below with reference to FIGS. 2, 3 and 4. The window 64 defines a window axis which is denoted by 101 and intersects the container axis 4 at right angles. The wall part 11 has an essentially cylindrical casing 103 of a metallic, weldable material, preferably stainless steel, and annular flanges welded nondetachably and tightly to the ends of the casing. The casing 103 is provided, for each window 64 arranged in the wall part 11, with a hole 103a which is bounded by a connecting section 103b projecting slightly outward, at least in part, away from the cylindrical main section of the casing 103. The casing 103 and each of its connecting sections 103b consist of a continuous, one-piece sheet metal part and have an inner surface 103c. In the production of the wall part 11, the originally completely cylindrical casing 103 can be provided with a hole 103a for each window 64, and the connecting section can then be bent, i.e. at least for the most part, slightly outward by means of a shaping device in such a way that that edge of the inner surface 103c which bounds the hole 103a is in a plane parallel to the container axis 4 and at right angles to the window axis 101 and forms a circle. The connecting section 103b is at least partly curved in section passing through the window axis 110 and is connected continuously, i.e. without corners and edges, by means of curved transition segments, for example in all sections passing through the window axis, to the cylindrical main section of the casing 103.

The window 64 has a flat composite plate 104 with a flat glass pane 105 consisting of mineral glass and having a circular contour. The glass pane 105 has a flat inner surface 105a adjacent to the interior 28, a flat outer surface 105b parallel to said inner surface and a cylindrical circumferential surface 105c. The composite plate 104 furthermore has a holder 106. This is formed by a circular ring of a metallic, weldable material, for example stainless steel. The material of the annular holder 106 forms, in cross-section, a solid quadrilateral, namely a rectangular parallelogram and, for example, a rectangle. The holder 106 has a flat inner surface 106a adjacent to the interior 28, a flat cuter surface 106b parallel to said inner surface, a cylindrical lateral surface 106c facing the glass pane and parallel to the window axis and a cylindrical circumferential surface 106d facing away from the glass pane. The glass pane 105 rests with its circumferential surface 105c against the lateral surface 106c of the holder 106 and is nondetachably and tightly connected to the holder, namely fused in said holder. The glass pane 105 and the holder 106 are of equal thickness and have the thickness d measured parallel to the window axis 101.

The holder 106 is nondetachably and tightly connected, namely welded in a manner which will be described in detail, to the connecting section 103b by means of a metallic, weldable connection part or retainer 107 consisting of stainless steel and originally separated from the casing 103 and the holder 106. The connection part or retainer 107 consists of a one-piece ring having a circular contour. The material of the annular connection part 107 is U-shaped in cross-section so that the connection part thus has a U-shaped profile. The connection part 107 has, in a section through the window axis 101, a cylindrical web 107a which forms that boundary of the connection part which is furtherest away from the window axis 101. The connection part 107 furthermore has two flat limbs 107b, 107c which project inward away from the web 107a toward the window axis 101 and are parallel to one another and at right angles to the window axis. The limb 107b is closer to the ceasing 103 and to the container interior 28 and thus forms the inner limb of the connection part. The limb 107c accordingly forms the outer limb of the connection part. The inner limb 107b forms at least the greatest part of that inner surface 107d of the connection part 107 which is adjacent to the interior 28. The external diameter of the annular connection part 107 is at least approximately equal to the diameter of the hole 103a. The connection part 107 rests, at the outer end of its inner limb 107b which is continuous with the web 107a, against that end or edge of the connecting section 103b which faces away from the casing 103. Said connecting section is connected at the stated end on the inside and outside by a weld joint 109 or 110, respectively, i.e. a weld seam, firmly, nondetachably and tightly to the connection part 107.

The dimension of the connection part 107 measured parallel to the window axis 101 is equal to the thickness of the glass pane 105 and of the holder 106. The internal diameter of the annular connection part 107 is approximately equal to the external diameter of the holder 106 so that the latter fits tightly and at least almost without play into the connection part 107.

In cross-section, the web 107a is, for example, approximately of the same thickness as the sheet metal forming the casing 103. Each limb 107b, 107c has, in cross-section, a thickness s which is, for example, approximately equal to the thickness of the web 107a. Each limb 107b, 107c has, in cross-section, a dimension or height h measured from the inner surface of the web 107a. Said dimension or height is approximately equal to the distance of that edge of the connecting section 103b which is welded to the connection part 107 from the circumferential surface 106d of the holder 106. Those faces of the two limbs 107b, 107c which face one another are a distance a apart. The thickness s of the limbs 107b, 107c is preferably at most 25%, preferably at most 15% and, for example, approximately 10% of the thickness d. The dimension or height h of the limbs 107b, 107c is preferably at least 5% and, for example, approximately 7% to 12% of the external diameter of the holder 106 and preferably at least 50% and, for example, approximately 70% to 120% of the distance a. The external diameter of the holder 106 may be, for example, about 45 mm to 250 mm. The thickness d may then be, for example, approximately 10 mm to 30 mm—depending on the external diameter of the holder 106 and on the required compressive strength. The thickness s can then be, for example, about 1 mm to 3 mm.

Those ends of the limbs 107b and 107c which face away from the web 107a are adjacent to the circumferential surface 106d at the two edges of the cylindrical circumferential surface 106d of the holder 106. Those surfaces of the two limbs 107b, 107c which face away from one another are at least approximately flush with the two flat surfaces 106a and 106b, respectively, of the holder 106. The two limbs 107b and 107c are firmly, nondetachably and tightly connected to the holder 107 by weld joints 111 and 112, i.e. weld seams.

The inner surface 103c of the casing 103 and the inner surfaces 105a, 106a, 107d are connected steplessly and continuously with one another at the connection points of the various parts. The inner surfaces 105a, 106a, 107d of the window lie in a plane which is approximately and, for example, exactly tangential to the cylindrical inner surface of the main section of the casing 103. In the section shown in FIG. 2 and passing through the axes 4 and 101, the inner surface 103c of the casing 103 is then, for example, straight and parallel to the flat inner surfaces 105a, 106a, 107d of the window 64, even in the connecting section 103b, and is connected flush, continuously and smoothly with the flat inner surface 107d of the connection part 107 by the weld joint 109. In the section shown in FIGS. 3 and 4 and passing at right angles to the container axis 4 through the window axis 101, the inner surface of the connecting section 103b makes, at least in parts, an angle with the inner surface 107d of the connection part 107. This angle is at least 90° everywhere, preferably more than 90° and up to 180° everywhere. In the section shown in FIGS. 3 and 4, the connection section 103b is, for example, slightly curved in an S-shape so that its inner surface is approximately or exactly straight and forms a flush connection with the inner surface 107d of the connection part 107 and connects this continuously and smoothly, i.e. without edges, to the inner surface of the cylindrical main section of the casing 103. The connecting section 103b accordingly widens in sections passing through the window axis 101, in general in a direction away from the connection part 107.

Composite plates having an annular holder 106 and a glass pane 105 fused therein are commercially available with various dimensions, for example from Herberts Industrieglas GmbH+Co. KG, Wuppertal, Germany. The connection part 107 can be produced from a solid body, for example by cutting operations. The connection part 107 thus forms a one-piece, continuous, closed ring. In the production of a container, the connection part 107 is, for example, first welded to the holder 106 and then to the casing 103. The weld joints 109, 110, 111, 112 may be formed, for example, by arc welding using an inert gas. The weld joints 109, 111, 112 are, for example, also ground and polished after the actual welding process. The inner surfaces 105a, 106a, 107d, together with the weld joint 111, then form a continuous cohesive, flat, smooth surface. This is, at the weld joint 109, preferably at least approximately smooth and continuous with the inner surface 103c of the casing 103. The surfaces 105b, 106b and that surface of the limb 107c which faces away from the casing 103, together with the weld joint 112, likewise form a continuous cohesive, flat and smooth surface.

If the connection part 107 is welded to the connection part 103b and to the holder 106 for fastening the window 64 in the wall part 11, deformations and stresses may occur in the connecting section 103b, in the connection part 107 and in the holder 106. By carrying out the welding processes in a suitable manner, these deformations and stresses can be kept relatively small. Furthermore and in particular, the connection part 107 with its relatively slim limbs 107b, 107c between the connecting section 103b and the holder 106 can substantially compensate the deformations and stresses occurring during welding. Owing to the described formation of the window, it is therefore possible to ensure that the glass pane is not damaged by cracks or fissures as a result of the stated deformations and stresses, either during welding of the window to the wall part 11 or afterward during use of the container 3.

The windows 61, 63 which likewise have a circular contour are preferably arranged on the essentially conical casings of the wall parts 9 and 10, respectively, in such a way that the flat surfaces of their glass panes, holders and connection parts or retainers are parallel to that section of the conical casing of the relevant wall part which is closest to them, in a vertical section through the container axis 4 and the window axis of the relevant window. The window axes of the windows 61, 63 then intersect the container axis 4 at an angle which differs from 90°. Apart from these differences, the windows 61 and 63 may be formed identically or similarly to the window 64 described with reference to FIGS. 2 and 3.

The elongated window 62 shown separately in FIG. 5 has a composite plate 124 with a plurality of circular glass panes 125, for example four circular glass panes 125, whose centers lie on a straight line which in turn lies in a vertical plane through the container axis 4. The window 62 has an elongated, one-piece holder 126 with four circular holes in which the glass panes 125 are fused. The circumferential surface of the holder 126 has two straight sections running in its longitudinal direction and parallel to one another and two semicircular sections connecting said parallel sections to one another in pairs. Furthermore, a connection part or retainer 127 enclosing the holder 126 is present. Said connection part or retainer has the shape of an elongated ring, corresponding to the contour of the holder 126. Moreover, the connection part 127 is formed similarly to the connection part 107 and is welded, analogously to this, to the conical casing of the wall part 10 and to the holder 126. The height h of the limbs of the connection part 127 is then preferably at least 5% and, for example, at least 7% of the width of the holder 126.

The window 94 of the downstream dust remover 71 may be formed and fastened identically or similarly to the window 64.

The operation of the fluidized-bed apparatus 1 will now be described.

When a particulate material, for example serving to form a drug, is to be agitated and treated in the container 3, a batch of this particulate material is introduced through the temporarily opened material inlet 33 into the fluidizing and process space 28b. Furthermore, a process gas consisting of air is sucked through the gas inlet 29 into the gas distribution space 28a, from this upward through the perforated bottom 21 in its horizontal position, through the fluidizing and process space 28b and through the filters 27 into the clean gas space 28c and then through the gas outlet 29 and out of the container 3 and through the downstream dust remover 71. The process gas fluidizes the particulate material so that the latter forms a fluidized bed. This is present in the lower part of the fluidizing and process space 28b. During fluidization of the material, a spray material which is at least partly liquid is sprayed at least temporarily, possibly by means of the spray member 37, onto the particles of the material in order to agglomerate said particles and/or to provide them with a coating. Furthermore, the particles are dried during fluidization. The spray members 43 and 47 of the wet cleaning devices 45 and 53, respectively, are essentially completely in the housings 42 and 46, respectively, outside the wall 5, during fluidization of the material. The spray members 53 and 57 of the wet and cleaning devices 51 and 55, respectively, are essentially completely above the fluidizing and process space 28b. The latter and the gas distribution space 28a thus contain, during treatment of a material, no spray members which serve for wet cleaning. The same applies to the crude gas space 89a of the downstream dust remover.

During the fluidization of the particulate material, particles of the material and/or dust formed by abrasion of said particles and possibly spray material may reach the inner surfaces of the wall parts 9, 10, 11 and windows 61, 62, 63, 64 which are adjacent to the fluidizing and process space 28b. Since no seals, no fissures or crevices and also virtually also no dead spaces for the process gas flowing from bottom to top through the container 3 are present near the windows and near the connections of the windows to the wall parts containing them, the tendency for dust or other impurities to be deposited on the inside of the windows is small. Tests have shown that the glass panes of the windows remain more or less transparent for a long time—even when a tacky spray material is sprayed onto the particles of the material.

Dust may also reach the inner surfaces of the windows 94 of the downstream dust remover 71, but once again at most very little of this dust accumulates.

A part of the inner surface of the wall 5 and at least some of the parts present in the material container 3 are cleaned, i.e. washed, with a cleaning liquid from time to time and in particular on changing the processed, particulate material and the product produced from this. The various wall parts of the container remain tightly connected to one another. For the wet cleaning, a cleaning liquid which is under a pressure of, for example, 400 kPa to 1000 kPa and has a temperature of from 0° C. to 100° C. or possibly up to 150° C. is fed alternately or simultaneously to the wet cleaning devices 41, 45, 51, 55. The cleaning liquid consists, for example, of water to which a detergent or other cleaning additive is also added for certain cleaning phases. The spray members 43, 47 previously in their rest position are displaced by the cleaning liquid into the container interior 28, to the cleaning positions shown in FIG. 1. Furthermore, the cleaning liquid displaces the spray members 53, 57 previously in the rest positions downward into the cleaning positions shown in FIG. 1. The spray members of the wet cleaning devices 41, 45, 51, 55 then spray cleaning liquid against the outer surfaces of the filters 27, the lower surfaces of the inner wall part 25, the inner surfaces of the wall parts 8 to 11 and possibly also of the wall parts 6 and 7 and those inner surfaces of the windows 61 to 64 which are adjacent to the interior 28. The cleaning liquid is discharged from the container 3, for example through the material outlet 34. During this cleaning, the inner surfaces of the wall parts and windows which are adjacent to the fluidizing and process space 28b are satisfactorily cleaned without the container 3 having to be opened. The windows nondetachably fastened to the wall 5 do of course remain in the wall during the cleaning. The formation of the windows and their connection with the wall parts of the container 3 help to ensure that the cleaning liquid reaching the windows during a wet cleaning can readily flow away from said windows everywhere.

Those inner surfaces of the wall and windows of the downstream dust remover container 73 which are adjacent to the crude gas space 89a of the downstream dust remover 71, and the filters 81 present in said container, can be cleaned in a similar manner with the aid of the wet cleaning devices or wash devices 85, 86.

The connection part or retainer 137 shown in FIG. 6 forms a closed ring and may have a circular contour, for example as in the case of the connection part 107, or an elongated contour as in the case of the connection part 127, and may replace the connection part 107 or 127. The connection part 137 has a U-shaped profile with a web 137a and two limbs 137b and 137c parallel to one another. These limbs are in general bounded by flat surfaces parallel to one another. However, each limb 137b, 137c is provided, in its surface facing the other limb in each case, with at least one groove running along the limb and, for example, with two or more such grooves. The limbs then have a constriction 137d in each of these grooves. The retainer 137 can be welded to a wall part and a holder of a window in a manner analogous to that described for the connection part 107.

The wall part shown in FIG. 7 comprises a casing 203 having a window. The window possesses at least one glass pane 205 and a holder 206. The holder 206 is provided with at least one limb 206e which projects away from the or each glass pane 205 of the window and consists of a one-piece member together with the remainder of the holder 206. The or each limb 206e is welded directly to the casing 203 consisting of a sheet metal, but could possibly be welded to another sheet metal section of a wall part. The window shown in FIG. 7 comprises, thus, no initially separate part corresponding to the previously described connection parts 107, 127, 137 and having a U-shaped cross-section.

The apparatus may also be modified in other ways. For example, the four circular glass panes 125 of the window 62 could be replaced by a single, elongated glass pane.

Furthermore, it would be possible to provide a material container which contains a rotor instead of a perforated bottom. Said rotor is rotatable about the vertical container axis and has a disk which has an essentially flat, horizontal surface on its upper side. The rotor then forms the lower boundary of a process space in which a particulate material lying at least from time to time on the disk can be agitated and treated. The wall of the material container may then have at least one window adjacent to the process space and formed in the manner described.

The container provided with at least one window may instead possibly contain a drum for agitating a particulate material or a stirrer for mixing and/or wet granulation of a pasty material.

The container may furthermore be in the form of an autoclave, fermenter or other reaction container or may be formed for any other purpose.

Moreover, it is possible to connect at least one window, in a manner according to the invention, to an essentially flat and/or arched sheet metal piece which belongs to a bottom wall part or top wall part of a container.

Furthermore, the wall of a line for conducting a flowable material—such as a fluid and/or a particulate material—can also be provided with a window. This window may then be arranged, for example, tangentially to a cylindrical surface of the line or radially at an end of a line section and may be welded to a wall part of the line.

For further details of the apparatus—in particular of the wet cleaning devices 51, 55, 85, 86, of the filters and of the gas cleaning devices and of the formation and sealing of the perforated bottom—reference may be made to the U.S. patent applications Ser. Nos. 08/773,328, 08/772,329 and 08/772,765 simultaneously filed claiming the priorities of the Swiss Patent Applications 3706/95, 3707/95 and 3709/95 and hereby incorporated by reference.

What is claimed is:

1. A wall which encloses an interior and has at least one wall part with at least one window, said window including at least one glass pane adjacent to the interior and having a circumferential surface, said window including a holder which encloses said glass pane of said window, is connected tightly and nondetachably to the circumferential surface of said glass pane and has an inner surface adjacent to the interior and wherein said holder is tightly and nondetachably connected to the wall part by a connection part.

2. A wall as claimed in claim 1, wherein each said glass pane is connected to the wall part exclusively by non-elastomeric parts.

3. A wall as claimed in claim 1, wherein each said wall part, said holder, and said connection part include metallic materials.

4. A wall as claimed in claim 3, wherein said holder is welded to said connection part and said connection part is welded to said wall part.

5. A wall as claimed in claim 1, wherein said glass pane and said holder of said window together form a flat composite plate.

6. A wall as claimed in claim 1, wherein said connection part encloses said holder and is originally separated from the wall part and from the holder and is connected to the holder by at least a first connection and is connected to the wall part by at least a second connection a distance away from said holder, wherein said wall part, said glass pane, said holder and said connection part have inner surfaces adjacent to the interior and wherein the inner surfaces which belong to said window and said wall part having said window are connected steplessly and without gaps to one another.

7. A wall as claimed in claim 6, wherein the inner surfaces of each said glass pane belonging to the same window, of the holder belonging to said window and of the connection part belonging to said window are flat and lie in a common plane and wherein the wall part connected to the said window has a connecting section which abuts said connection part and whose inner surface, in sections through the window, is one of straight and parallel to the inner surface of the connection part and connects flush with said inner surface, and of making an angle of at least 90° with the inner surface of the connection part.

8. A wall as claimed in claim 7, wherein the said angle is more than 90°.

9. A wall as claimed in claim 1, wherein said connection part has a web and two limbs which project away from said web toward the holder, one of said webs being adjacent to the interior.

10. A wall as claimed in claim 9, wherein the two limbs of the connection abut a circumferential surface of the holder and have flat surfaces which face away from one another and are parallel to one another and each of which lies in the common plane with a flat surface of the glass pane and with a flat surface of the holder.

11. A wall as claimed in claim 9, wherein the connection on part is U-shaped in cross section and is connected to the wall part at that end of the limb adjacent to the interior which is continuous with the web.

12. A wall as claimed in claim 9, wherein the two limbs have surfaces which face one another and are a first distance apart, wherein each limb has, in cross-section, a height which is measured between a web surface facing the holder and that end of the limb which faces away from said web, wherein said height is at least 50% of said first distance, and wherein each limb has a thickness which is at most 25% of the height.

13. A wall as claimed in claim 1, wherein said wall part has a one-piece casing which encloses an axis, is essentially rotationally symmetrical with said axis and is connected to the connection part of said window.

14. A wall as claimed in claim 1, further comprising at least one cleaning device for spraying a cleaning liquid in the interior for cleaning inner surfaces of said wall part and said window which are adjacent to the interior.

15. A wall as claimed in claim 1, wherein the interior contains a process space for at least one of receiving, agitating and treating a particulate material and of at least one filter which serves for the filtration of gas passed through a particulate material.

16. A wall which encloses an interior and has at least one wall part with at least one window, said window including at least one glass pane adjacent to the interior and having a circumferential surface, wherein said window includes a holder which encloses each glass pane of said window, said holder having an inner surface adjacent to the interior and having a lateral surface, wherein said circumferential surface of said each glass pane rests completely against said lateral surface of said holder and is tightly and nondetachably connected to said holder, wherein said holder is tightly and nondetachably connected to the wall part by a connection part, and wherein each said glass pane is connected to said wall part exclusively by non-elastomeric parts.

17. A wall as claimed in claim 16, wherein each said glass pane is fused in said holder.

18. A wall as claimed in claim 16, wherein said at least one wall part, said holder, and said connection part are of metallic materials, and wherein said holder is welded to the connection part and said connection part is welded to said at least one wall part.

19. A wall as claimed in claim 16, wherein said connection part encloses said holder and is originally separated from said wall part and said holder, said connection part connected to said holder by a first connection and connected to said wall part by a second connection spaced apart from said holder, wherein said wall part, said glass pane, said holder, and said connection part have inner surfaces adjacent to said interior and wherein said inner surfaces are connected steplessly and without gaps to one another, and wherein the inner surfaces of said glass pane, said holder, and said connection part are flat and lie in a common plane, wherein said wall part connected to said window has a connecting section which abuts said connection part and whose inner surface, in sections through the window, is straight and parallel to the inner surface of said connection part and connects flush with said inner surface.

20. A wall as claimed in claim 16, wherein said connection part encloses said holder and is originally separated from said wall part and said holder, said connection part connected to said holder by a first connection and connected to said wall part by a second connection spaced apart from said holder, wherein said wall part, said glass pane, said holder, and said connection part have inner surfaces adjacent to said interior and wherein said inner surfaces are connected steplessly and without gaps to one another, and wherein the inner surface of said glass pane, said holder, and said connection part are flat and lie in a common plane, wherein said wall part connected to said window has a connecting section which abuts said connection part and whose inner surface, in sections through the window, makes an angle of at least 90° with the inner surface of said connection part.

21. A wall as claimed in claim 16, wherein said connection part has a web and two limbs which project away from said web toward the holder, one limb of which is adjacent to the interior, and wherein the connection part is U-shaped in cross-section and is connected to the wall part at that end of the limb adjacent to the interior which is continuous with the web.

22. A wall which encloses an interior and has at least one wall part with at least one window, said window including at least one glass pane adjacent to the interior and having a circumferential surface, wherein said window includes a holder which encloses each glass pane of said window, said holder having an inner surface adjacent to the interior and having a lateral surface, wherein said circumferential surface of each said glass pane rests completely against said lateral surface of said holder and is tightly and nondetachably connected to said holder, wherein said holder is tightly and nondetachably connected to the wall part by a connection part, and wherein said holder and said connection part are non-elastomeric parts.

23. A wall which encloses an interior and has at least one wall part with at least one window, said window including at least one glass pane adjacent to the interior and having a circumferential surface, said window including a holder which encloses said at least one glass pane, said holder connected tightly and nondetachably to the circumferential surface of said glass pane and having an inner surface adjacent to the interior, said holder directly, tightly, and nondetachably connected to said wall part, said holder comprising a one-piece member and including at least one limb which projects away from said glass pane and is welded to said at least one wall part.

24. A wall as claimed in claim 23, wherein said at least one wall part and said holder consist of metallic materials and wherein said holder is welded directly to said at least one wall part.

25. A wall as claimed in claim 23, wherein said at least one wall part has a one-piece casing which encloses an axis, is essentially rotationally symmetrical with said axis, and wherein said limb is welded to said casing.

26. A wall as claimed in claim 23, wherein said at least one glass pane is connected to said wall part exclusively by non-elastomeric parts.

* * * * *